Aug. 4, 1942.   H. O. DROTNING ET AL   2,292,218
CAMERA CONSTRUCTION
Filed Feb. 17, 1940   2 Sheets-Sheet 1

HENRY O. DROTNING
HOWARD G. FAY
INVENTORS

BY
ATTORNEYS

Aug. 4, 1942.   H. O. DROTNING ET AL   2,292,218
CAMERA CONSTRUCTION
Filed Feb. 17, 1940   2 Sheets-Sheet 2
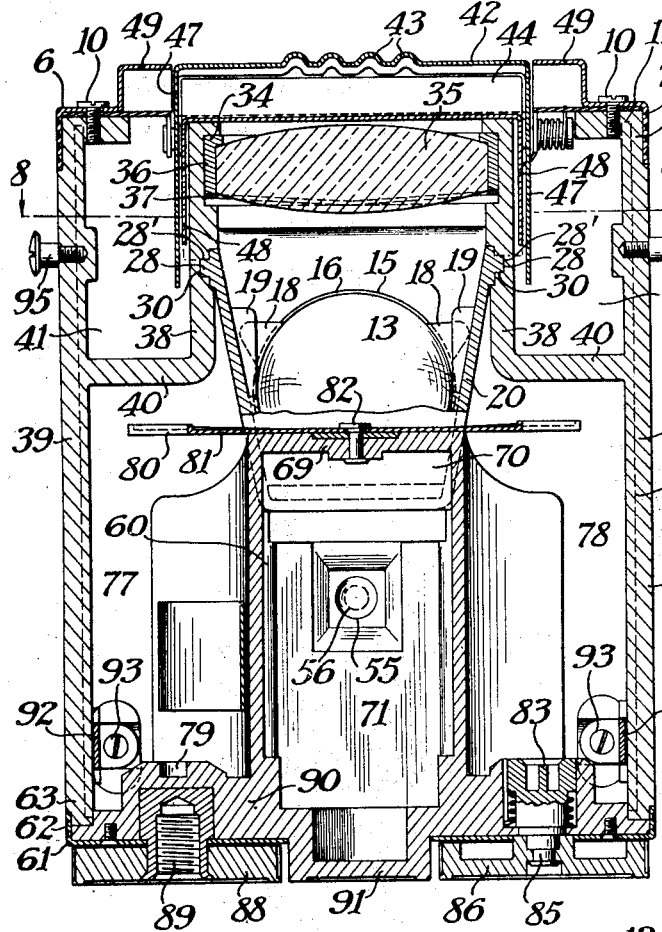
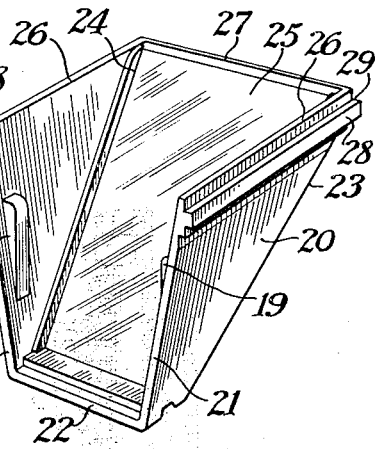
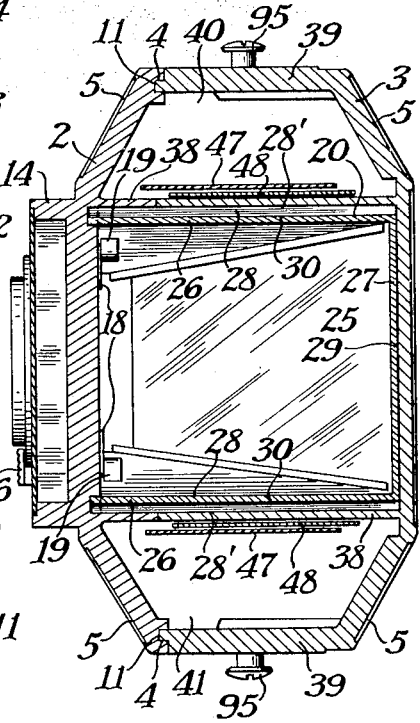
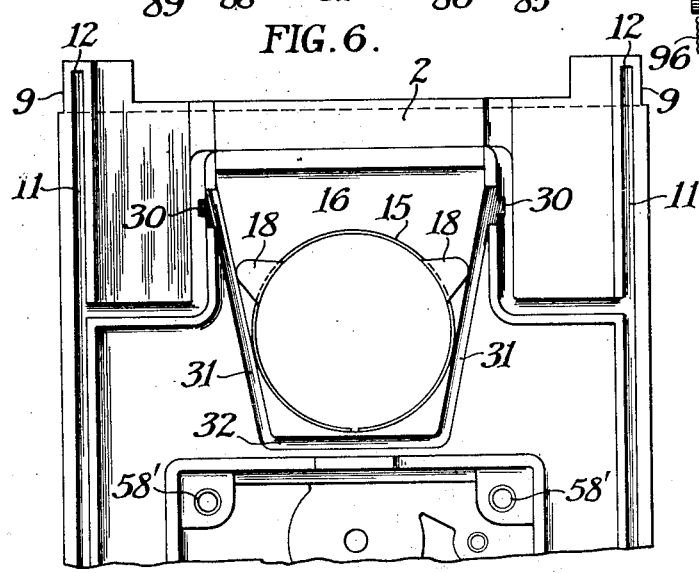
HENRY O. DROTNING
HOWARD G. FAY
INVENTORS
BY *Newton N. Perrier*
*Donald H. Stewart*
ATTORNEYS Patented Aug. 4, 1942

2,292,218

UNITED STATES PATENT OFFICE 2,292,218

CAMERA CONSTRUCTION

Henry O. Drotning and Howard G. Fay, Rochester, N. Y., assignors to Eastman Kodak Company, Rochester, N. Y., a corporation of New Jersey Application February 17, 1940, Serial No. 319,554

14 Claims. (Cl. 95—31)

This invention relates to photography, and more particularly to roll holding photographic cameras.

One object of our invention is to provide a camera suitable for making of moldable materials. Another object of our invention is to provide a camera in which a series of interfitting molded parts are used, the parts being so arranged that very little manual work is necessary in assembling the camera. Still another object of our invention is to provide a compact roll-holding camera with an extremely large built-in view finder. A still further object of our invention is to provide a camera carrying a roll holder which can be readily loaded with film and positioned in the camera body, and other objects will appear from the following specification, the novel features being particularly pointed out in the claims at the end thereof.

In general, our camera is composed of a pair of interengaging body members which together form a multi-sided tubular body, in the top of which a finder is placed, and in the bottom of which a roll holder may be placed, the finder and roll holder both being made lightproof by means of suitable tongues and grooves. A top cap member on the camera body definitely holds the body parts together, and, in addition, supports a finder hood, and a similar cap member on the bottom of the camera is slidably mounted thereon and carries the roll-holding structure. The various parts are arranged so that they are supported by tongues and grooves in the front and back camera parts, thus reducing the number of fasteners, such as screws and rivets, which are usually required for cameras of this type.

Coming now to the drawings, in which like reference characters denote like parts throughout:

Fig. 5 is a section taken on line 5—5 of Fig. 2.

Fig. 6 is a fragmentary rear elevation of a portion of the front camera section wall 2.

Fig. 7 is a perspective view of the mirror element holding frame removed from the camera.

Fig. 8 is a section on line 8—8 of Figs. 2 and 5.

Figure 1:
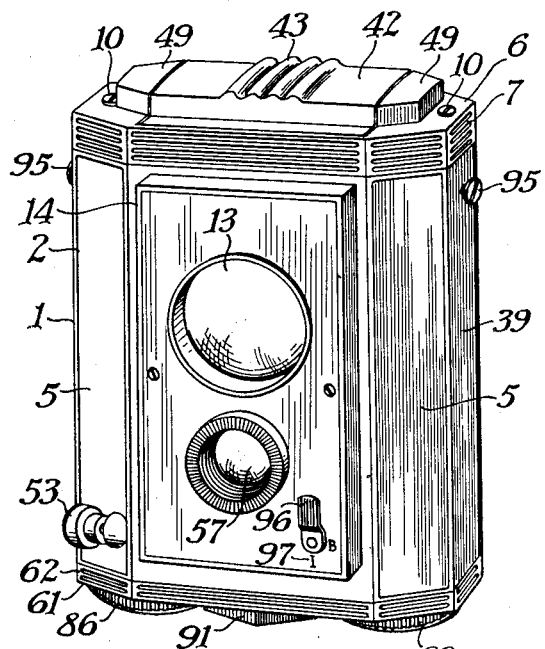
Fig. 1 is a perspective view of a typical camera constructed in accordance with and embodying a preferred form of our invention.
Figure 3:
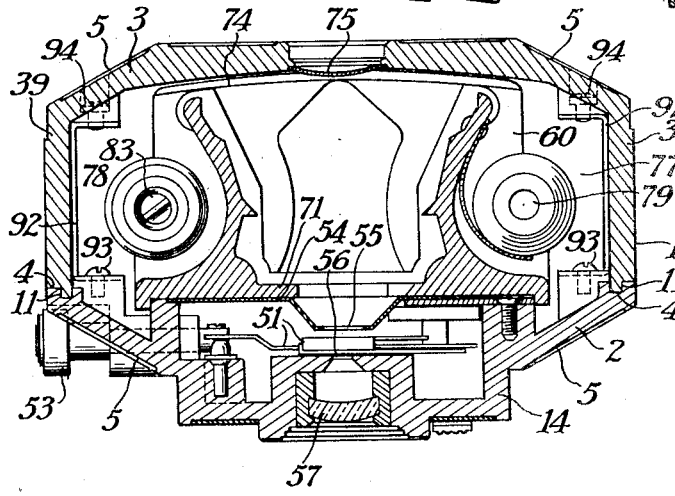
Fig. 3 is a section on line 3—3 of Fig. 2.

Referring to Fig. 1, which shows a preferred embodiment of our invention, the camera may consist broadly of a camera body 1, which, as shown in Fig. 3, may consist of a front body portion 2 and a rear body portion 3, which are joined together by the tongue and groove connections at 4. These two camera body sections form, in effect, a rectangular tubular member, open at the top and bottom and, in the embodiment illustrated, having the corners removed to form angular spaced decorative walls 5.

Figure 2:
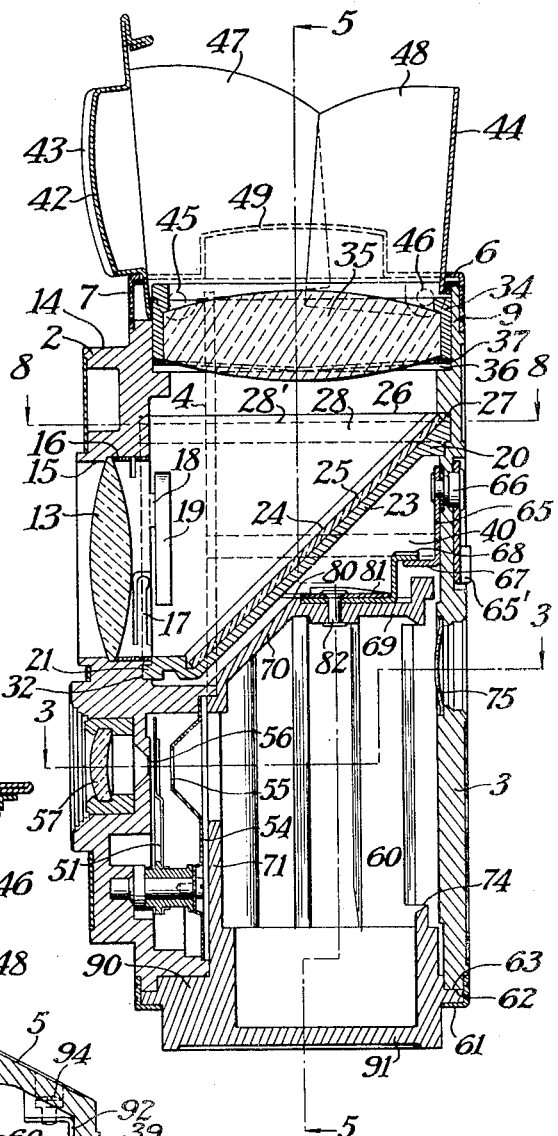
Fig. 2 is an enlarged sectional view on a plane taken parallel to the axes of the two lenses of the camera shown in Fig. 1.

The top of the body sections consists of a cap member 6, having a downwardly extending flange 7, which, as best shown in Fig. 2, engages an upwardly extending flange 9 on the camera wall sections. Thus, this cap member, which may be held in place by the screws 10, shown in Fig. 5, holds the body sections 1 and 2 tightly together with their tongue and groove surfaces 4 in contact.

As indicated in Fig. 6, the camera body section 2 is provided with the grooved walls 11, which form portions of the tongue and groove connections 4, these grooves terminating at 12 above the flanged areas 9 which support the top cap member 6. Since the tongues on the complementary shaped parts of the body section 1 fit into these grooves 11, they limit longitudinal movement of one section relative to the other, while the parts are being assembled. A similar construction is used at the lower ends of the grooves 11, not shown.

The upper part of the camera body supports a large size view finder—preferably one which will show a full size image. This finder comprises a front objective 13, preferably mounted in a forwardly extending, but shallow housing 14, carried by the camera body section 2. As indicated in Fig. 2, the objective 13 fits into a rabbet 15 in the molded housing, and is held in place by an annular ring 16, having a pair of spring fingers 17 and including a pair of outwardly flared lugs 18, best shown in Fig. 6. These lugs are positioned to lie opposite a pair of lugs 19, carried by the finder element holding frame 20, best shown in Fig. 7, for purposes to be later described.

As indicated in Figs. 2 and 7, the finder element holder 20 consists of a small housing, having front edge walls 21, a bottom edge wall 22, and a slanting back wall 23, which supports, in side grooves 24, a mirror 25. The frame also includes side top walls 26 and a rear top wall 27, about which flanges 28 and 29 extend. This holding frame may be readily assembled by sliding the flange sections into corresponding grooves 30, in the camera body sections, and there is also on the front body section 2, a pair of grooves 31, connected by a cross-groove 32, which will receive the edges 21 and 22 of the finder holding bracket. Thus, when the finder holding bracket 20 is slid into place and the camera sections 1 and 2 are placed together, the finder element holding frame 20 is not only fixedly held in place, but, through the action of the lugs 19 and the lugs 18 of the spring ring 16, the front finder lens 13 is definitely positioned into place.

The finder also includes an upper finder element holding frame 34, which is substantially square and which carries the viewing lens 35. This frame 34 is slidably mounted in the groove 36 in the camera body sections, as best shown in Fig. 5, and there is a spring washer 37, as indicated in Fig. 2, to hold the viewing lens 35 in its proper position when the camera front and back body sections are assembled.

As shown in Fig. 5, the camera body is provided with a pair of spaced, parallel walls 38 which are substantially parallel to the side walls 39 of the camera body and which have supporting grooves for not only the viewing lens 35, mounted in its frame 34, but they are also provided with grooves 28' which receive the complementary shaped flanges 28 of the view finder element holding frame 20. These walls are connected with transverse walls 40 which extend outwardly to the end walls 39 and which form substantially light-tight pockets 41 to either side of the view finder to form spaces into which portions of the hood members may slide when in the folded position shown in Fig. 5.

As above explained, the cap member 6 supports a hood. This hood may consist of a hinged cover member 42 which we prefer to provide of metal formed with suitable decorative embossings 43. The hood consists of two sections, the hood member 42 and the hood member 44, the former being pivoted at 45 to the cap member 6 and the latter being pivoted at 46 to the cap member.

The hood members are alike except for their shape and dimensions, in that the hood member 42 is provided with a pair of side wings 47 and the hood member 44 is provided with a pair of side wings 48. Thus, when the hood is in a raised or operative position, as shown in Fig. 2, it extends completely around the viewing lens 35 and shades it from light. However, when the parts are to be folded into the Fig. 1 position, the hood member 44 and the hood member 42 are turned about their pivots into the folded position shown in Fig. 4 and in Fig. 5, and in the latter figure, the side wings 47 and 48 are shown as passing down into the substantially light-tight pockets 41. The top cap is also provided with a pair of decorative end formings 49 to each side of the hood.

Figure 4:
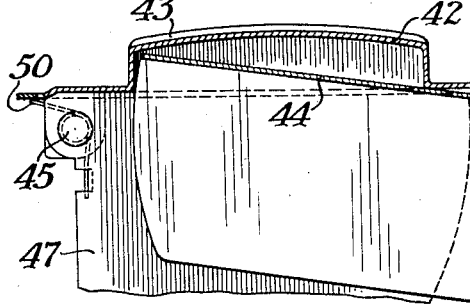
Fig. 4 is an enlarged fragmentary section showing a portion of the hood construction.

We also provide spring members 50 about the hinges 45 and 46, one of which is shown in Fig. 4, so that when the upper hood member 43 is drawn out, both hood members will spring into their operative or raised position.

The box-like front extension 14 on the camera body section 2 is adapted to enclose a shutter, shown broadly as 51 in Fig. 3. This shutter may be of the type shown in a copending application, Serial No. 255,914, Drotning, filed Feb. 11, 1939, so that the structure need not be fully described herein, except to point out that the shutter blade 52 may be operated by a trigger member 53 on the outside of the wall section 2 and that the blade and other shutter mechanism are held in place by a cover plate 54, which is provided with an aperture 55, registering with the aperture 56, which lies directly behind the camera objective 57. The shutter forms no part of the present invention and need not be further described. The cover plate 54 is, however, held on by screws 58 passing into correspondingly threaded apertures 58', shown in Fig. 6.

In the lower part of the tubular camera body formed by the sections 1 and 2, a roll holder, designated broadly as 60, is mounted, this roll holder being carried by a bottom cap member 61, having upstanding flanges 62 about its periphery to engage a rabbet 63 extending around the camera body section members. This cap is removably held in place by the latch member 65, carried by the pivot 66 and having a latch element 67 engageable under the latch element 68, carried by a top wall 69, adjacent a slanting wall 70 directed downwardly to the front wall 71 of the roll holder. A handle 65' may be used to turn the pivot 66.

When the roll holder, which includes a cap, is inserted into the camera body, it may be held in place by the latch 67—68.

The roll holder is provided with an exposure frame 74, behind which there is the usual non-actinic red or green window 75 for viewing the the exposure numbers on the film backing paper. Film may be drawn from a supply film spool, located in a spool chamber 77, to a spool located in a take-up spool chamber 78.

A spool is held in chamber 77 by having the trunnion of the spool engage the socket 79 at its lower end, and the spool holding bracket notch 80 at its upper end. The walls forming the upper spool support 80 are carried by a spring arm 81, riveted at 82 to the roll holder wall 69. A similar trunnion holder 83 is arranged in the spool chamber 78 above a winding flange 84, carried by a shaft 85 and terminating in the winding knob 86 on the bottom of the camera, as best shown in Fig. 5. A known type of one-way clutch in the form of a coiled spring is used, so that the knob 86 may only be turned in a direction to wind film thereon.

In order to make the bottom of the camera uniform, we prefer to provide a dummy knob 88, which is fastened on by means of a tripod socket member 89, which as carried by a portion of the bottom wall 90 of the roll holder. The center portion of the bottom 91 is formed as a decorative member to make the camera appear symmetrical.

Since the bottom cap member 62, carrying the roll holder, is removably secured to the camera, we prefer to provide additional means at the bottom for holding the body sections 1 and 2 together. Such means consist of a pair of metal brackets 92 inside the edge walls 39 and formed over at each end, so that screws 93 may attach these brackets to the front wall section 2 and screws 94 may attach these brackets to the rear wall sections. It is only necessary to provide these screws at the bottom of the camera casing, because the upper cap member 7 is not removable and forms the means for holding the camera sections together at the top.

We also may provide studs 95 on each side of the camera near the top for a carrying handle or strap, and we prefer to provide a lever 96 which may be moved over a scale 97 to indicate the type of exposure for which the camera is set.

While the camera construction described above sounds comparatively complicated, and the parts appear to be rather intricate in design, it must be remembered that this camera is particularly designed to be made of molded material, and it is further particularly designed so that the molded parts may be rapidly assembled by unskilled labor.

In assembling our camera, an operator may pick up the camera section 1 and rapidly slide into place the upper viewing lens holding frame 36 with the lens 35 in place and the lower view finder element holding frame 20 with the mirror 25 in place, after having first preferably assembled the latch element 65 in place by its stud 66.

The front camera section 2 then has the shutter 51 assembled in the forwardly extending housing 14 and the front finder lens 13 is dropped against its receiving rabbet 15, the spring ring 16 being snapped into place. The operator then engages the interengaging flange and grooves designated broadly as 4, thus locating the body members 1 and 2 relative to each other, and thus holding the finder element frames in place, as well as the front finder lens 13 through the engagement of lugs 18 and 19.

The upper cap 6 has previously been assembled with the hood members 47 and 48 and this cap can be rapidly positioned by sliding the flanges 7 over the interengaging flanges 8 and by attaching the cap member by the two screws 10. The brackets 92 have been previously assembled to the section 2, and by placing the two screws 94 in place, the bottom of the camera body is assembled.

The roll holder is a single molded part mounted on the lower cap member 62, so that the camera is completed by merely moving the roll holder up through the open bottom of the camera body where it can be held in place by engaging the latch elements 67 and 68.

It will be noted that the assembling operations are extremely simple and they can be performed quickly by relatively unskilled help. The many interengaging flanges 4, 11, 31, 36, 21, 26, 29, 34, 7, 8, 61 and 62 all form light-tight joints, and, in addition, render the camera parts interfitting to such an extent that the parts can be properly and quickly brought together in assembling the camera.

By providing the inside walls 38 with their outside extensions 40 to form substantially light-tight pockets 41, and by the flanged construction of the finder element frames, it is impossible for light to pass down through the finder into that portion of the camera occupied by the roll holder. The pockets 41 also provide spaces into which the side wings 47 and 48 of the hood members 42 and 44 may fold, and they also, through the walls 40, form upper walls for the film spool chambers 77 and 78.

We claim:

1. In a camera, the combination with a two part camera body including a back and a front member secured together forming front, back and side walls, of top and bottom caps engaging the back and front members and forming top and bottom walls, a plurality of tongue and groove connections between the back and front members and between the top and bottom caps forming the top and bottom walls, spaced grooves parallel with the top and bottom walls inside of the camera front and back members, and finder element holding frames positioned and carried in these grooves in assembled relation by the front and back members.

2. In a camera, the combination with a two part camera body including a back and a front member secured together forming front, back and side walls, of top and bottom caps engaging the front and back members and forming top and bottom walls, a plurality of tongue and groove connections between the back and front members and between the top and bottom caps and the front and back members, spaced grooves parallel with the top and bottom walls in the inside of the camera front and back members, and finder element holding frames positioned and carried in these grooves in assembled relation, a roll holder carried by the bottom cap member and including means for holding film spools and an exposure frame, said interengaging finder element frames and said tongues and grooves forming light tight means for preventing light from reaching the film stretched across the exposure frame from one spool to the other.

3. In a camera, the combination with a two part camera body including a back and a front member secured together forming front, back and side walls, of top and bottom caps fitting over the back and front members forming top and bottom walls, a plurality of tongue and groove connections between the back and front members and between the top and bottom cap members and the front and back members, spaced grooves parallel with the top and bottom walls in the inside of the camera front and back members, and finder element holding frames positioned and carried in these grooves in assembled relation, a roll holder including an exposure frame and film spool supports carried by the bottom cap and insertable between the front and back members, an upper wall on the roll holder slanting downwardly from the back to the front, one of said finder element holding frames including a wall slanting downwardly from the back to the front whereby the roll holder and finder element holding frame slanting walls may be adjacent each other when the roll holder is inserted in the camera body.

4. In a camera, the combination with a two part camera body including a back and a front member secured together forming front, back and side walls, of top and bottom caps engaging the back and front members forming top and bottom walls, a plurality of tongue and groove connections between the front and back members and between the top and bottom caps and the front and back members, spaced grooves parallel with the top and bottom walls in the inside of the camera front and back members, and finder element holding frames positioned and carried in these grooves in assembled relation, a roll holder including an exposure frame and film spool supports carried by the bottom cap and insertable between the front and back members, an upper wall on the roll holder slanting downwardly from the back to the front, one of said finder element holding frames including a wall slanting downwardly from the back to the front whereby the roll holder and finder element holding frame slanting walls may be adjacent each other, and interengaging tongues and grooves on the roll holder and the inside of the camera front member positioned to be slidably engaged to definitely locate the roll holder relative to the front member when the roll holder is assembled in the camera body.

5. In a camera, the combination with a two part camera body including a back and a front member secured together forming front, back and side walls, of top and bottom caps engaging the back and front members forming top and bottom walls, a plurality of tongue and groove connections between the front and back members and between the top and bottom caps and the front and back members, spaced grooves parallel with the top and bottom walls in the inside of the camera front and back members, a mirror holding frame including side walls, a slanting bottom wall and flanges extending around the top of the side walls and the top of the slanting bottom wall and positioned in engagement with the grooves parallel to the top carried by the inside camera back whereby said mirror holding frame may be held in assembled position by the camera front.

6. In a camera, the combination with a two part camera body including a back and a front member secured together forming front, back and side walls, of top and bottom caps engaging the back and front members forming top and bottom walls, a plurality of tongue and groove connections between the front and back members and between the top and bottom caps and the front and back members, spaced grooves parallel with the top and bottom walls in the inside of the camera front and back members, a mirror holding frame including side walls, a slanting bottom wall and flanges extending around the top of the side walls and the top of the slanting bottom wall and positioned to engage the grooves parallel to the top carried by the camera back, an aperture in the camera front wall including a flange facing the inside of the camera body, a lens lying in the aperture against the flange, a spring washer engaging the lens, lugs on the mirror holding frame engaging the washer to hold the front lens and mirror holding frame in operative relationship between the front and back camera sections.

7. A camera comprising in combination, a two part camera body including a camera front and back, a finder element frame and a mirror frame, tongue and groove connections between these frames and the camera body members arranged transversely thereof whereby said frames may be retained by the assembled camera front and back, means for holding the camera front and back together including, a top cap having tongue and groove connections with the camera body and extending across the top of the finder element frame, and a window in said top cap registering therewith, hood members adjacent said window and mounted to cover or expose said window.

8. A camera comprising a camera body made in two pieces, and including a camera back and front, tongue and groove connections between the camera front and back for aligning these parts in two directions, a finder section within the front and back parts, a tongue and groove connection between the finder section and the camera front and back and extending around the edge walls of the finder section, said section being retained in light tight connection with the front and back by the tongues and grooves when the camera front and back walls are assembled, means for holding the front and back walls in assembled relation, a movable bottom wall engaging the front and back walls, a roll holder carried thereby and slidably mounted to move into and out of the camera body, a top cap interfitting with the two piece camera body, and a frame mounted beneath the top cap and above the finder section for holding a finder element therebetween.

9. In a camera, the combination with a camera body including a front and back, the front and back each including parts of side walls and beveled corner walls, tongue and groove connections between the front and back, top and bottom caps for covering the ends of the front and back walls, a focusing hood carried by the top wall, a view finder mounted beneath the top wall, a roll holder carried by the bottom cap, a slidable connection between the roll holder and the front and back walls, an objective supported by the front wall behind which the roll holder may slide, means for retaining the back and front body sections in assembled relationship including the top cap section fitting over parts of the back and front sections, and means for holding the bottom cap and roll holder in operative position behind the objective in a picture taking position.

10. In a camera, the combination with a camera body forming front, back and edge walls constituting a hollow tubular body, of a finder mounted in the top of the tubular body, a roll holder movably mounted in the bottom of the tubular body, a top cap carrying a window through which an image formed by the finder may be viewed, a bottom cap carrying a roll holder the top and bottom caps each including flanges fitting over the ends of the tubular camera body, an objective carried by the front of the camera body positioned to form an image upon a film carried by the roll holder and a film winding knob on the outside of the bottom cap extending to a winding flange inside of the roll holder, and means for supporting film carried by the roll holder.

11. In a camera, the combination with a camera body forming front, back and edge walls constituting a hollow tubular body, of a finder mounted in the top of the tubular body, a roll holder mounted in the bottom of the tubular body, a flanged top cap carrying a window through which an image formed by the finder may be viewed, a flanged bottom cap carrying a roll holder, means included in the roll holder for supporting film spools, an exposure frame spacing the film spools, an objective carried by the front wall of the camera body in alignment with the exposure frame, said flanged top and bottom caps closely fitting the ends of the tubular camera body and a winding knob on the outside of the bottom cap and extending through the cap into the roll holder to engage a film spool mounted thereon.

12. In a camera, the combination with a camera body forming front, back and edge walls constituting a hollow tubular body, of a finder mounted in the top of the tubular body, a roll holder mounted in the bottom of the tubular body, a flanged top cap carrying a window through which an image formed by the finder may be viewed, a flanged bottom cap carrying a roll holder, said flanged top and bottom caps forming closures for the ends of the hollow tubular body, means included in the roll holder for supporting film spools, an exposure frame spacing the film spools, an objective carried by the front wall of the camera body in alignment with the exposure frame, and a winding knob on the outside of the bottom cap and to one side thereof, and a protuberance on the opposite side of the bottom wall of substantially the same height as the winding knob to form with the winding key a supporting base for the camera.

13. A camera comprising, in combination, a two-part camera body including a camera front member and a camera back member, a finder element frame and a mirror frame, means for positioning the frame members between the camera front member and the camera back member comprising tongue and groove connections between the frames and body members arranged transversely of the body members, means for retaining the camera front and back members together comprising a flanged top cap engaging both the camera front and back members to hold them together, and fastening members spaced from said top cap and engaging the camera front and back members for holding them together.

14. A camera comprising, in combination, a two-part camera body including a camera front member and a camera back member, a finder element frame, a mirror frame, and means for positioning the frames between the camera front member and the camera back members comprising tongue and groove connections between said frames and said camera body members, said tongue and groove connections arranged transversely of the camera body members, means for securing the camera body members in assembled relationship, a removable bottom wall normally engaging the camera front and back members, a camera roll holder carried thereby, and tongues and grooves on the camera body members and roll holder for guiding the latter into the former and into an operative position beneath the said mirror frame.

HENRY O. DROTNING.
HOWARD G. FAY.